UNITED STATES PATENT OFFICE.

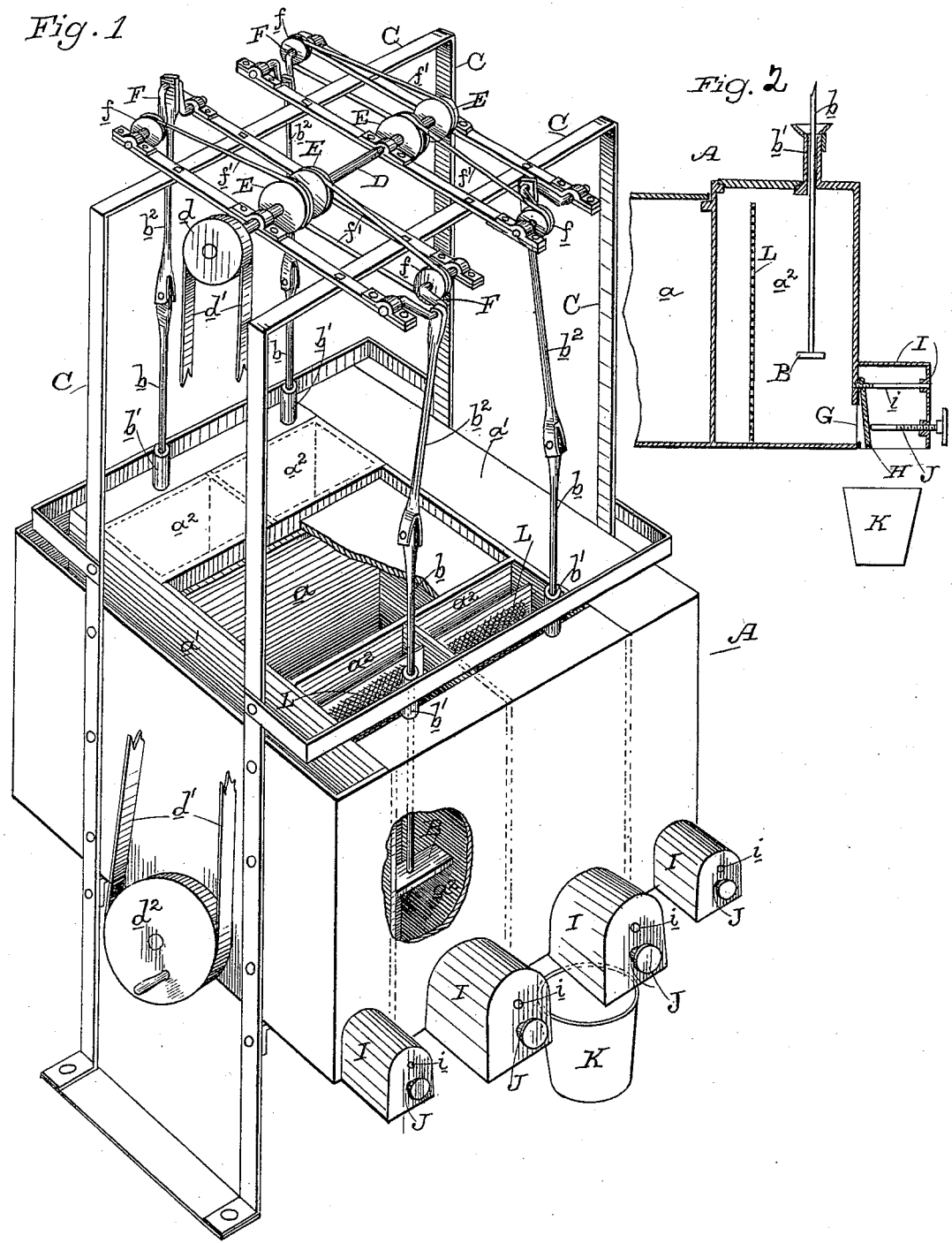

EDWARD H. GERRISH, OF SAN FRANCISCO, CALIFORNIA.

LIQUID SHAKING AND COOLING MACHINE.

SPECIFICATION forming part of Letters Patent No. 494,474, dated March 28, 1893.

Application filed November 9, 1892. Serial No. 451,457. (No model.)

*To all whom it may concern:*

Be it known that I, EDWARD H. GERRISH, a citizen of the United States, residing in the city and county of San Francisco, State of California, have invented an Improvement in Liquid Shaking and Cooling Machines; and I hereby declare the following to be a full, clear, and exact description of the same.

My invention relates to that class of machines in which beverages are cooled and shaken, and to which the name of "milk shakes" is commonly applied.

My invention consists in the novel construction of the compartment liquid reservoir and the means for cooling and agitating the liquid therein, all of which I shall hereinafter fully describe and specifically point out in the claims.

The object of my invention is to provide a machine or apparatus in which liquids of various kinds or flavors, especially milk, can be kept cool, rapidly agitated and quickly served.

Referring to the accompanying drawings for a more complete explanation of my invention,—Figure 1 is a perspective view of my machine. Fig. 2 is a vertical section showing one of the compartments and the discharge valve.

A is the reservoir. It consists of a suitably constructed vessel, divided into any required number of compartments of suitable shapes. I have here shown a central compartment $a$, two oblong side compartments $a'$, and four substantially square end compartments $a^2$. Each of these compartments is fitted with a suitable removable cover. In each of the compartments $a^2$ is a vertically reciprocating dasher B, having a stem $b$ passing up through a suitable boxing $b'$ in the top, said boxing being here shown in the form of a drip cup.

Rising from the reservoir A is a frame-work C, in the top of which is mounted the drive-shaft D, to which any suitable power may be applied. I have here shown a pulley $d$ from which a belt $d'$ extends to a driving pulley $d^2$ below. Upon shaft D are mounted the pulleys E.

In frame C are mounted separate crank shafts F, one over each compartment $a^2$. Each shaft carries a pulley $f$ from which a belt $f'$ extends to one of the pulleys E on shaft D. With each crank shaft F one of the stems $b$ of a dasher B is connected by a pitman $b^2$.

In the lower portion of the outer wall of each compartment $a'$ and $a^2$ is made a large discharge port G, which is controlled by a valve H. The whole bottom of valve case I is open and under this is to stand the tumbler K or other vessel in which the beverage is to be served to the customer.

In each liquid compartment I may place a screen L near the wall of the cooling compartment, to separate and hold back the frozen portions of the liquid which form on the ice chamber wall.

The operation of my machine is as follows:— Any suitable cooling medium, such, for example, as ice and salt, is to be placed in the central compartment $a$. Liquids of various kinds, or of various flavors are to be placed in compartments $a'$ and $a^2$. I prefer to place milk in one of the compartments $a'$ and buttermilk in the other compartment $a'$. In compartments $a^2$ I prefer to place milk of various flavors. These liquids are thus kept cool by the ice and salt in the central compartment. When a customer wants cool milk or buttermilk, he is supplied from compartments $a'$ by opening valves H. If he should want a milk shake of particular flavor, the proper belt $f'$ is slipped on its pulley, (the other belts being loose) and power being applied, the dasher in that compartment in which the desired liquid is, is rapidly raised and lowered, thereby effectually agitating the milk.

If several customers have to be served, the liquid in the several compartments may be simultaneously agitated.

Having thus described my invention, what I claim as new, and desire to secure by Letters Patent, is—

1. A machine for shaking and cooling liquids consisting of a reservoir divided into separate compartments for containing the liquid and a cooling medium, dashers in the liquid containing compartments, having stems passing through the top of said compartments, a drive-shaft with pulleys above said reservoir, separate crank shafts with pulleys, separate belts between the pulleys of the drive shaft and the crank shafts and pitmen connecting said crank shafts with the stems of the dashers, substantially as herein described.

2. A machine for shaking and cooling liquids consisting of the reservoir with its liquid containing and cooling compartments having controllable discharges, the reciprocating dashers in said liquid containing compartments and the screens in said compartments near the cooling compartment walls, substantially as herein described.

In witness whereof I have hereunto set my hand.

EDWARD H. GERRISH.

Witnesses:
S. H. NOURSE,
J. A. BAYLESS.